3,517,947
GIFT CATALOG
Gail Bennett, Winnetka, Ill., assignor to Bennett Brothers, Inc., Chicago, Ill., a corporation of Illinois
Continuation of application Ser. No. 630,711, Apr. 13, 1967. This application June 26, 1969, Ser. No. 836,757
Int. Cl. G09f 7/12; B42d 15/04
U.S. Cl. 283—56                                                5 Claims

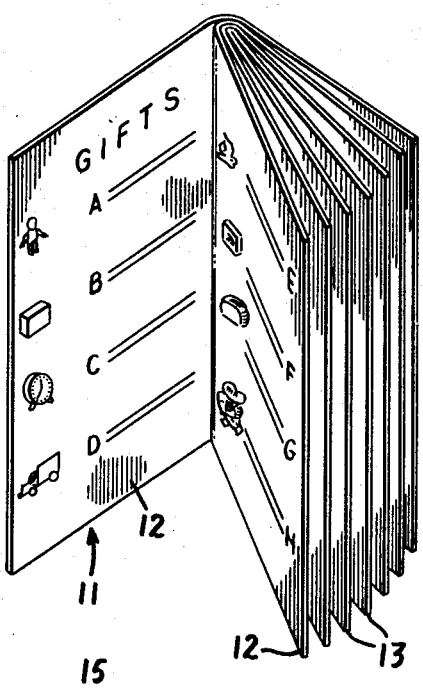

ABSTRACT OF THE DISCLOSURE

A gift catalog including a page which includes at least one removable composite tag having indicia thereon for identification of a gift ordered and a separable space portion for insertion of a personal message from the sender to the receiver.

---

This application is a continuation of application Ser. No. 630,711, filed Apr. 13, 1967, now abandoned.

Background of the invention

This invention relates generally to a gift catalog of a type especially adapted for use in purchasing items by mail order. Mail order catalogs have been known for many years and can be used for purchasing merchandise to be sent to the buyer or for purchasing merchandise to be sent as a gift to a third party. This invention relates to the latter category.

However, gifts ordered through catalogs have generally suffered from an impersonal nature due to the fact that they came directly from the catalog house or manufacturer rather than the giver. Some strides were made to personalize gifts given in such fashion by having a gift card or message written out by the catalog house enclosed with the gift with the message being based on instructions received from the giver. Unfortunately, gift cards written out in such fashion also tended to suffer from an impersonal air.

Summary of the invention

Generally speaking, in accordance with the invention, a gift catalog includes a page having one or more removable sections that can be removed by the purchaser and sent in to the catalog house with his order. Each removable section is in the form of a composite tag which is separable into a personal message section and an identifying tag section. A personal message may be written in on the message section by the giver and the merchandise purchased identified on the identifying tag section so that, on receipt of an order by the catalog house, the ordered merchandise can be identified and the personal message separated and enclosed with the gift. In such manner, those who order by catalog can personalize their gifts in the same manner as one who mails a gift with his own personal message enclosed.

Gift catalogs in accordance with the invention are especially useful for those in Service and particularly those overseas who do not have access to the usual retail outlets and mailing facilities. For example, a service man overseas can select all his Christmas gifts from a mail order catalog, send in an order with an identifying tag and personal message for each gift and the mail order house can attend to the rest by shipping the various merchandise and enclosing the personal message with minimal chance for incorrectly relating the personal message to the gift.

Accordingly, it is a principal object of this invention to provide a gift catalog which incorporates a removable composite tag which can be used by one purchasing gift merchandise for writing a personal message to be enclosed with the gift and for identifying the merchandise ordered to which the personal message relates.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

Brief description of the drawing

For a fuller understanding of the invention, reference is had to the following description taken in connection with the accompanying drawing, in which:

FIG. 1 is a perspective view of a partly opened catalog embodying the principles of the instant invention; and FIG. 2 is a plan view of page for the catalog of FIG. 1 incorporating a plurality of removable composite tag sections.

Description of the preferred embodiment

Referring to FIG. 1, a catalog 11 of any known construction consisting of a plurality of pages 12 has various gifts which are offered for sale described thereon. Such catalogs show, where possible, a picture of the item and provide a relatively complete description thereof indicating features, size, etc. and also indicating the price of the item. Incorporated in or supplied with the catalog may be an order form for ordering any selected merchandise from the catalog. One or more pages 13 are incorporated or inserted in the catalog with such pages having a special construction and format as shown in FIG. 2.

Pages 13 are preferably constructed of a relatively heavy or stiff paper or paperboard especially adapted for use as gift cards whereas pages 12 carrying the merchandise offered for sale will generally be of a relatively thin paper. Pages 13 are preferably bound in catalog 11 by any suitable means including the means used to bind the catalog together with staples 14 being indicated by way of example.

Page 13 consists of a plurality of removable composite tags 15 which may be removed from the page along a plurality of horizontal and vertical perforation lines 16 and 17, respectively. Each removable composite tag 15 is also divided by a line of perforations 18 into a personal message section 21 and an identifying tag section 22.

The personal message section may have imprinted thereon suitable indicia as an aid to the purchaser in writing a personal message, and ornamental art work to make an attractive personal message section. It is the personal message section 21 that becomes the gift card which is enclosed with the gift. Thus, the indicia may be in the form of printing such as the words "TO" and "FROM" with adequate space being provided for insertion of a personal message with the ornamental design imprinted on the gift card being any suitable design which may or may not be keyed to a particular gift giving season. Thus, if the gift catalog in which page 13 is included as a Christmas gift catalog, a candy cane or Christmas tree or Santa Claus or any other suitable attractive design may be imprinted. On the other hand, if the gift catalog is a general purpose catalog, the design may be in the form of a gift wrapped package or the like. The particular layout and printing on the gift card or personal message section is not critical although it is preferred that some indicia appear thereon to make more easily understood the purpose of the gift card for the benefit of the purchaser.

The identifying tag section also carries suitable indicia identifying information which must be inserted by the purchaser so that the appropriate gift card will be enclosed with the selected gift when the gift is mailed. Thus, as shown, the identifying tag section may have imprinted thereon indicia such as "CATALOG GIFT NO.," "ARTICLE," "YOUR NAME," and "ORDER NO." With the appropriate information filled in by the purchaser opposite the foregoing indicia or any other indicia that may be deemed necessary, the catalog house can identify the catalog from which the gift was selected, the article and the order number and also identify the purchaser in the event that the tags become removed from the order form.

In use, the purchaser makes his selection from a catalog, fills out an order form and also completes a removable composite tag 15 for each gift. The purchaser completes the personal message section with his own personal message and also provides the requested information on the identifying tag section. The entire removable composite tag 15 consisting of the personal message section 21 and the identifying tag section 22 is then removed along the perforation lines from page 13 and a composite tag may be provided with each gift ordered. The composite tag is enclosed with the order and it is mandatory that the identifying tag section not be removed from the personal message section when the order is mailed in. The two sections must remain together so that the mail order house can identify the particular gift with which the gift card is to be enclosed.

When the order is received by the gift house, it is processed and, at the appropriate time, the personal message section is removed from the identifying tag section so that the personal message may be enclosed with the gift when shipped.

While gift cards are known and have been in use for many years, the instant invention makes it possible for one who is unable to purchase items from a retail store, package them and mail them to accomplish the same result without having the gifts become impersonal as a result of the omission of a gift card or the inclusion of a gift card written out by an employee of the mail order house rather than by the giver. The instant invention is particularly suitable for servicemen in foreign theaters of operation whereby they may send personalized gifts to family and friends by mail order and yet have enclosed with each gift a gift card personally written by the serviceman and carrying his own personal message in his handwriting.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A catalog for the display and sale of articles by mail order to purchasers and direct shipment by the mail order seller to third parties comprising, article pages on which there are imprinted details of the articles offered for sale along with respective identifying indicia, an order form adapted to be mailed to the mail order seller for listing by a purchaser of an article selected for purchase and shipment to a designated third party, and at least one gift card page fastened in said catalog, said gift card page comprising at least one composite tag having a first portion including a substantial blank area designated for inscription by the purchaser of a personal message to the third party, and a second portion designated for inscription by the purchaser of information identifying the article that said personal message portion is to accompany, said composite tag being readily separable as a unit from said gift card page for transmittal with said order form, said first and second portions of said tag being readily separable from each other to enable inclusion of said first portion with the purchased article upon shipment thereof by said mail order seller after receipt of the order form.

2. A catalog according to claim 1 wherein said first portion of said tag is substantially larger than said second portion.

3. A catalog according to claim 1 wherein said gift card page is formed of material thicker than said article pages.

4. A catalog according to claim 1 wherein said first portion of said composite tag bears an imprint identifying the article with which it is enclosed as a gift and suggesting the occasion for which the gift was sent.

5. A catalog according to claim 1 wherein said gift card page includes a plurality of said composite tags, each of said tags having a common edge with an adjacent tag and being readily separable therefrom and from said page.

References Cited

UNITED STATES PATENTS

| | | | |
|---|---|---|---|
| 443,141 | 12/1890 | Kittredge | 283—56 |
| 1,114,920 | 10/1914 | Seeligson | 283—56 |

LAWRENCE CHARLES, Primary Examiner

U.S. Cl. X.R.

281—38; 283—63